United States Patent [19]
Takada et al.

[11] Patent Number: 5,921,886
[45] Date of Patent: Jul. 13, 1999

[54] APPARATUS AND METHOD FOR CONTROLLING IGNITION DURING A THROTTLE CLOSED DOWNSHIFT IN THE INTERVAL BETWEEN DOWNSHIFT SIGNAL AND ACTUAL DOWNSHIFT

[75] Inventors: Mitsuru Takada, Aichi-gun; Shigeo Kikori; Noboru Takagi, both of Toyota; Hideo Tomomatsu, Nagoya; Kunihiro Iwatsuki; Takashi Ohta, both of Toyota, all of Japan

[73] Assignee: Toyota Jidosha Kabushiki Kaisha, Toyota, Japan

[21] Appl. No.: 08/888,101

[22] Filed: Jul. 3, 1997

[30] Foreign Application Priority Data

Jul. 24, 1996 [JP] Japan ..................................... 8-195023
Dec. 27, 1996 [JP] Japan ..................................... 8-351395

[51] Int. Cl.$^6$ .............................. F02D 29/00; F02D 29/02
[52] U.S. Cl. ........................................... 477/110; 477/101
[58] Field of Search .............................. 477/97, 101, 105, 477/106, 107, 110; 701/65

[56] References Cited

U.S. PATENT DOCUMENTS 5,072,630  12/1991  Kikuchi et al. ...................... 477/101 X
5,445,576   8/1995  Motamedi et al. ...................... 477/105
5,577,979  11/1996  Iizuka ................................... 477/110 X

FOREIGN PATENT DOCUMENTS 53-129733  11/1978  Japan .
2-291434   12/1990  Japan .
3-9044      1/1991  Japan .
4-12139     1/1992  Japan .
5-229368    9/1993  Japan .
6-227289    8/1994  Japan ..................................... 477/101

Primary Examiner—Khol Q. Ta
Attorney, Agent, or Firm—Oblon, Spivak, McClelland, Maier & Neustadt, P.C.

[57] ABSTRACT

In an automatic transmission, torque shocks are effectively reduced in specific downshifting conditions where relatively strong engine braking occurs as a result of downshifting. When a downshift command to the automatic transmission is detected when an accelerator pedal is not depressed, a valve opening command is issued to a throttle valve so that engine output will have increased by the time the downshifting action of the automatic transmission actually begins, ignition timing is delayed so that an increase in engine output resulting from the opening of the throttle valve by a throttle valve control means is offset for a period starting at the time the engine output actually increases as a result of the opening of the throttle valve by the throttle valve control means and ending at the time the downshifting action of the automatic transmission actually beings, and the ignition timing delaying is cancelled upon initiation of the downshifting action of the automatic transmission.

8 Claims, 16 Drawing Sheets

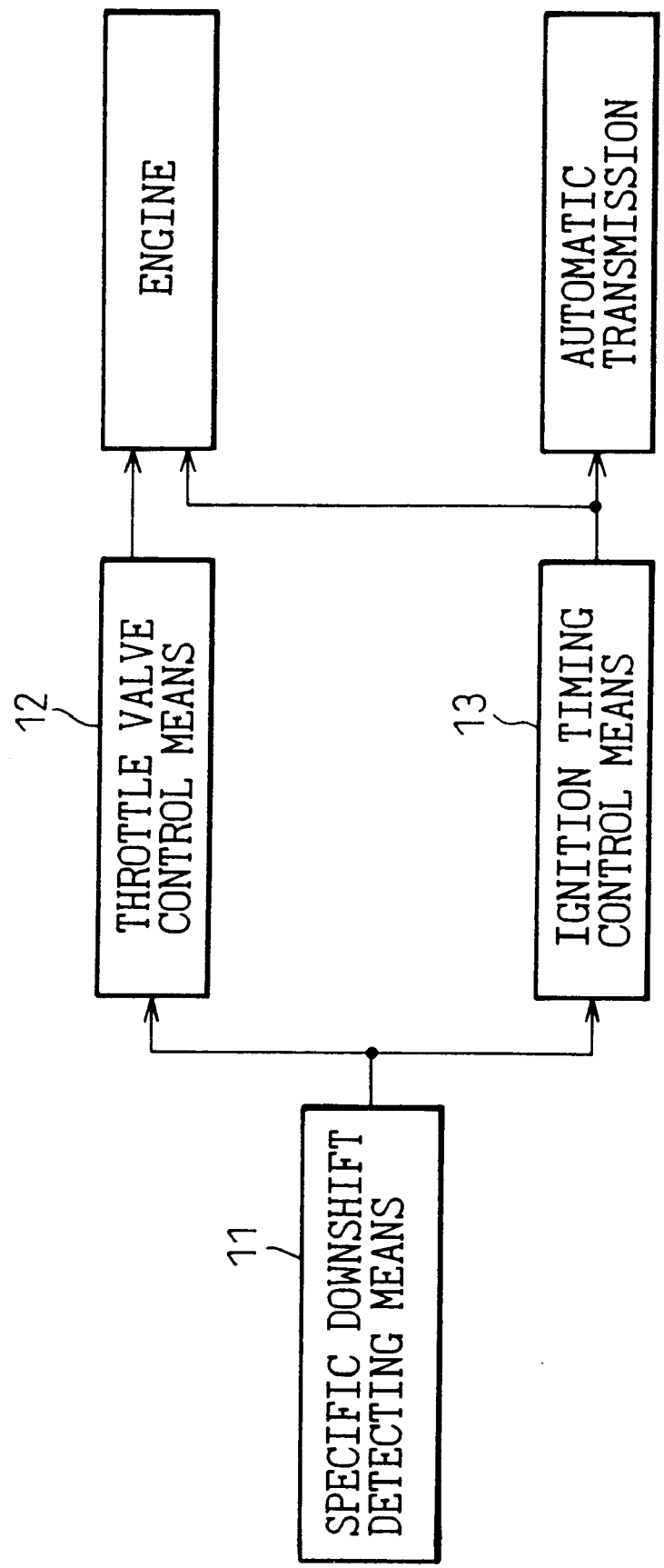

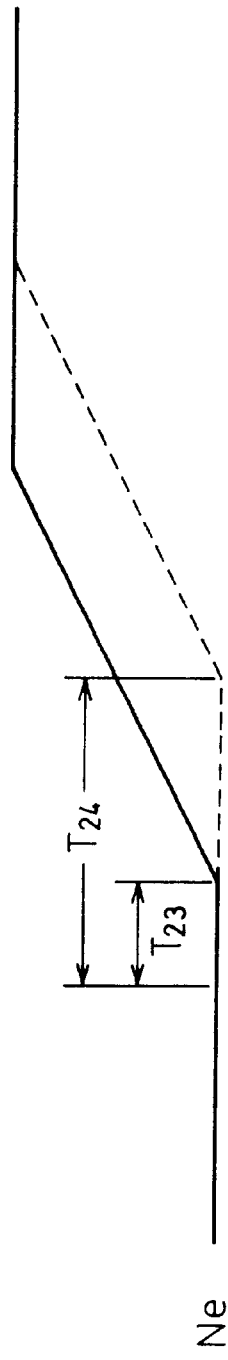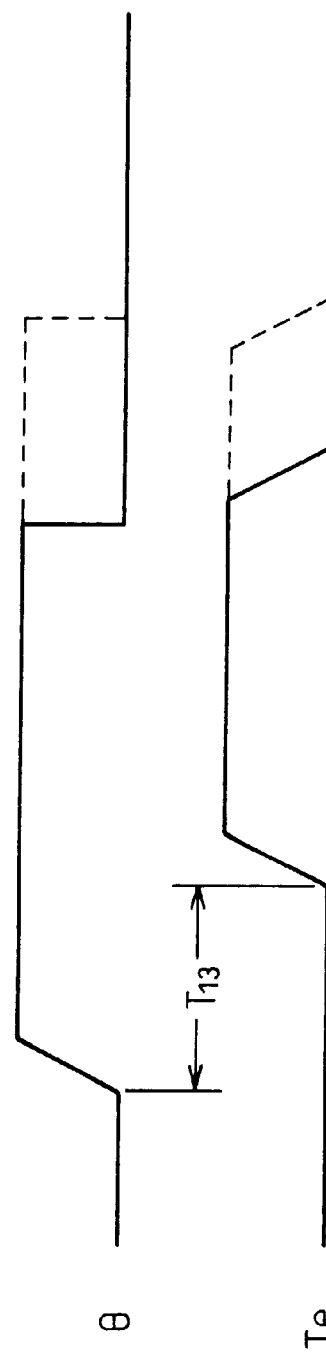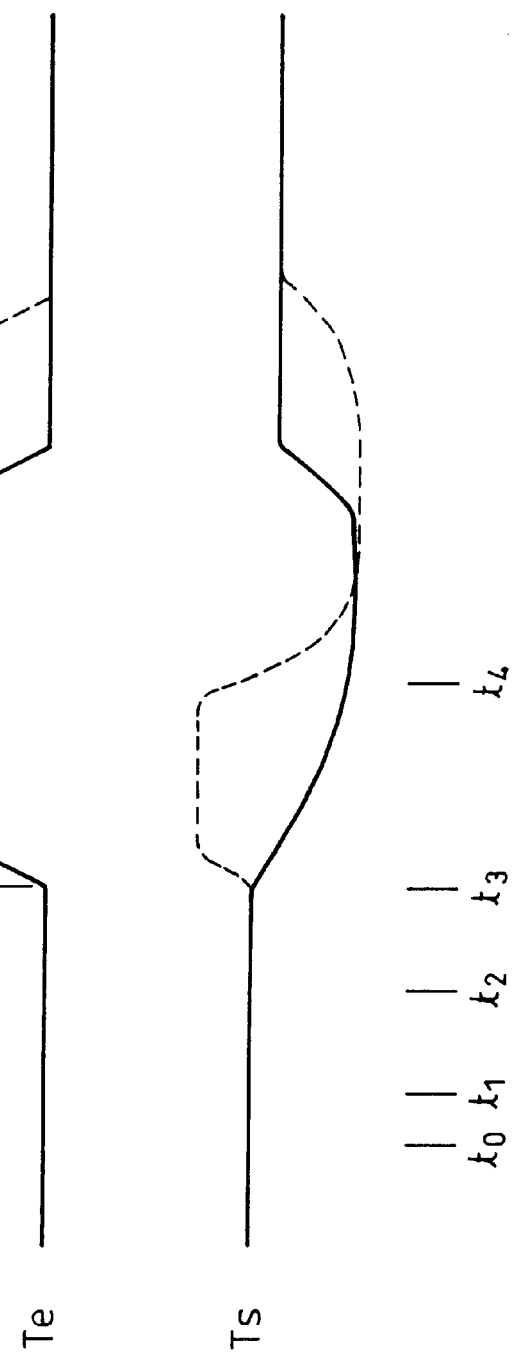

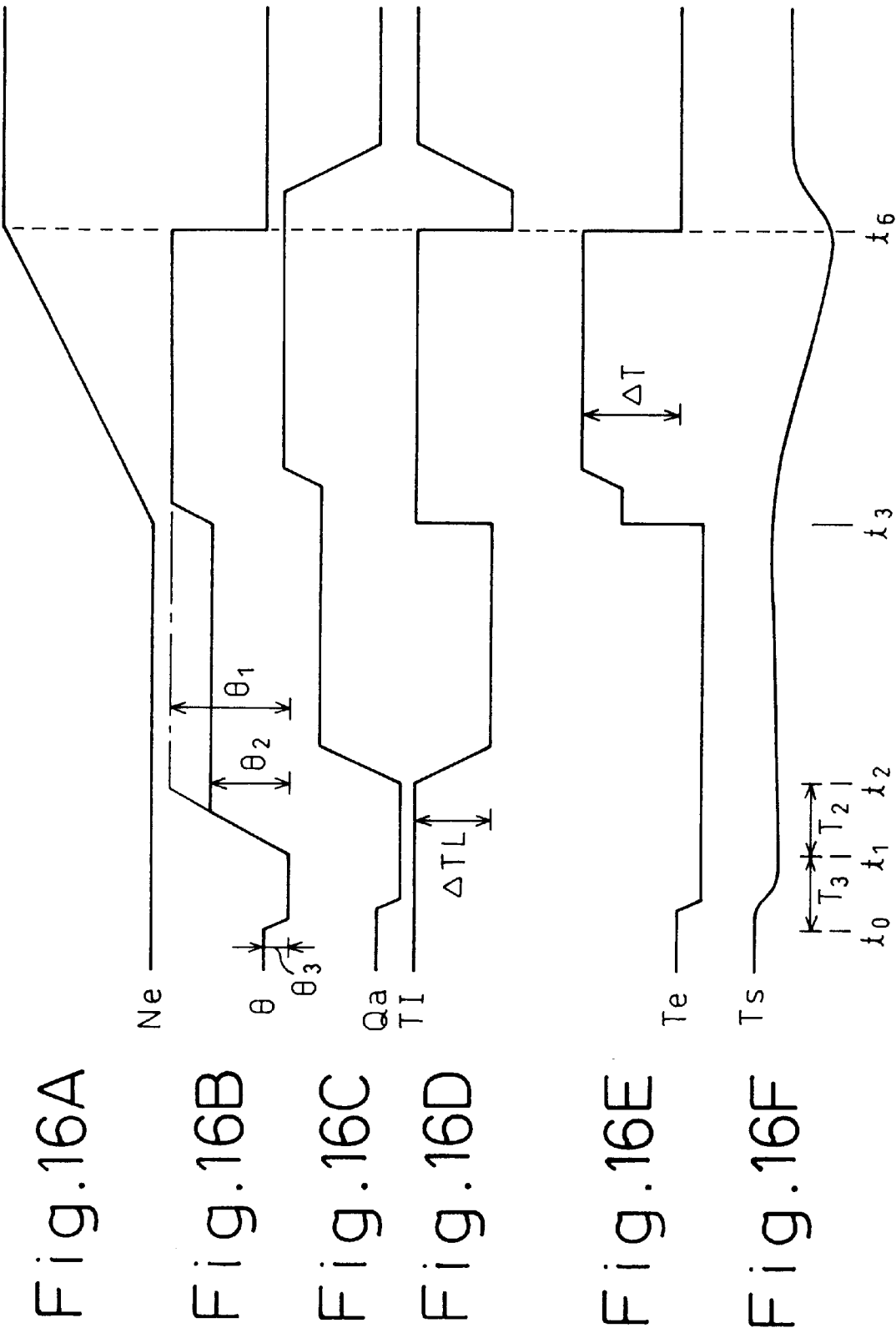

APPARATUS AND METHOD FOR CONTROLLING IGNITION DURING A THROTTLE CLOSED DOWNSHIFT IN THE INTERVAL BETWEEN DOWNSHIFT SIGNAL AND ACTUAL DOWNSHIFT

BACKGROUND OF THE INVENTION

1. Field of the Invention

The present invention relates to an apparatus for controlling a driving power of a vehicle equipped with an automatic transmission.

2. Prior Art

In recent years, automatic vehicles, i.e., vehicles equipped with automatic transmissions, have been increasing in number. In automatic vehicles, the gear ratio of the automatic transmission is controlled according to the vehicle speed and throttle valve opening.

In this case, if the accelerator pedal is released when driving downhill, and the vehicle speed nevertheless increases, a gear ratio is automatically shifted up so that an engine braking becomes less effective.

To solve this problem, it is already known to provide an apparatus designed to increase the engine braking effect by shifting a gear ratio down if a vehicle acceleration is not negative, or if a vehicle speed is continuously increased for a predetermined interval, when the accelerator pedal is not depressed.

However, when a gear ratio is shifted down, a problem, that is, a deterioration of drivability arises because an engine speed increases sharply, and an engine braking power becomes excessive.

To address this problem, there has already been proposed a transmission control apparatus designed to increase the engine output by opening the throttle valve when a gear ratio is shifted down while the accelerator pedal is not depressed (refer to Unexamined Japanese Patent Publication No. 5-229368).

This, however, cannot solve the problem of deteriorated driveability due to a torque shock caused by time lags, one from an opening of a throttle valve to increase of the engine speed and the other from an issue of a shift command (an activation of a solenoid) until an actual changeover of a gear ratio.

FIG. 2 is a diagram for explaining the problem, and engine speed Ne, throttle valve opening θ, engine torque Te, and drive shaft torque Ts are shown in this order from the top to the bottom. Time is plotted along the abscissa.

The downshift command is issued at time $t_0$, the throttle valve is opened at time $t_1$, and the engine torque Te begins to increase at time $t_3$.

In response to the downshift command issued at time $t_0$, the gear-shift solenoid of the automatic transmission is activated at time $t_2$.

If a gear-ratio changeover is actually performed at time $t_3$, that is, at the same time when the engine torque Te begins to increase after the activation of the gear-shift solenoid, the drive shaft torque Ts decreases smoothly as shown by the solid line and no torque shock occurs.

On the other hand, if the gear-ratio changeover is performed at time $t_4$ after the engine torque Te has increased due to the activation of the gear-shift solenoid, a torque shock occurs because the drive shaft torque Ts temporarily increases as shown by the dashed line.

While a time interval from an opening of the throttle valve to an increase of the engine torque Te can be estimated from the engine operating condition, it is not possible to estimate a time interval between an activation of the gear-shift solenoid and an actual changeover of the gear-ratio since it is influenced by the amount of hydraulic fluid filled in the piston of the relevant gear-shift clutch. It is therefore difficult to control so that the timing of the gear-ratio changeover coincides with the timing of the engine torque increase.

The problem of excessive engine braking also occurs when the vehicle is put in a non-driven condition after downshifting, even if the accelerator pedal is depressed.

SUMMARY OF THE INVENTION

Accordingly, it is an object of the present invention to provide an apparatus for controlling a driving power of a vehicle with an automatic transmission, which is capable of effectively reducing torque shocks caused at a specific downshifting operation which has a relatively strong engine braking power when a gear-ratio of an automatic transmission is shifted down.

FIG. 1 is a functional block diagram of an apparatus according to the present invention applicable to a vehicle equipped with an automatic transmission and a throttle mechanism capable of independently controlling a throttle opening. The apparatus comprises a specific downshift command detecting means 11 for detecting a specific downshift command that entails a relatively strong engine braking power, a throttle valve control means 12, and an ignition timing control means 13.

According to the first aspect of the present invention, there is provided an apparatus for controlling a driving power of a vehicle having an automatic transmission and a throttle system, an opening thereof is independently controllable, comprising:

a specific downshifting command detecting means for detecting a downshifting command issued to the automatic transmission when an accelerator pedal is not depressed, a throttle valve controlling means for opening the throttle valve so that an engine power is increased before the downshifting of the automatic transmission is actually executed when a downshifting command is detected by said specific downshifting command detecting means, and an ignition timing control means for delaying an ignition timing to compensate for the increased engine power caused by the opening of the throttle valve by said throttle valve controlling means from a point of time when the engine power is actually increased by the opening of the throttle valve by said throttle valve controlling means to a point of time just before the downshifting of the automatic transmission is actually executed and canceling the delaying of the ignition timing after the downshifting of the automatic transmission is actually executed.

According to the second aspect of the present invention, there is provided an apparatus for controlling a driving power of a vehicle having an automatic transmission and a throttle system, an opening thereof is independently controllable, comprising:

a specific downshifting command detecting means for detecting a downshifting command issued to the automatic transmission when an accelerator pedal is depressed, and the vehicle will be transferred to a driven condition after completing the downshifting.

a throttle valve controlling means for opening the throttle valve so that an engine power has been increased before the downshifting of the automatic transmission is actually executed when a downshifting command is detected by said specific downshifting command detecting means, and an ignition timing control means for delaying an ignition timing to compensate for the increased engine power caused by the opening of the throttle valve by said throttle valve controlling means from a point of time when the engine power is actually increased by the opening of the throttle valve by said throttle valve controlling means to a point of time just before the downshifting of the automatic transmission is actually executed and canceling the delaying of the ignition timing after the downshifting of the automatic transmission is actually executed.

BRIEF DESCRIPTION OF THE DRAWINGS

FIG. 1 is a functional block diagram of an apparatus for controlling a driving power of a vehicle according to the present invention;

FIGS. 2A–2D are dia grams for explaining a problem;

FIGS. 16A–16F are third diagrams for explaining the operation of the apparatus.

DETAILED DESCRIPTION OF THE PREFERRED EMBODIMENTS

Figure 3:
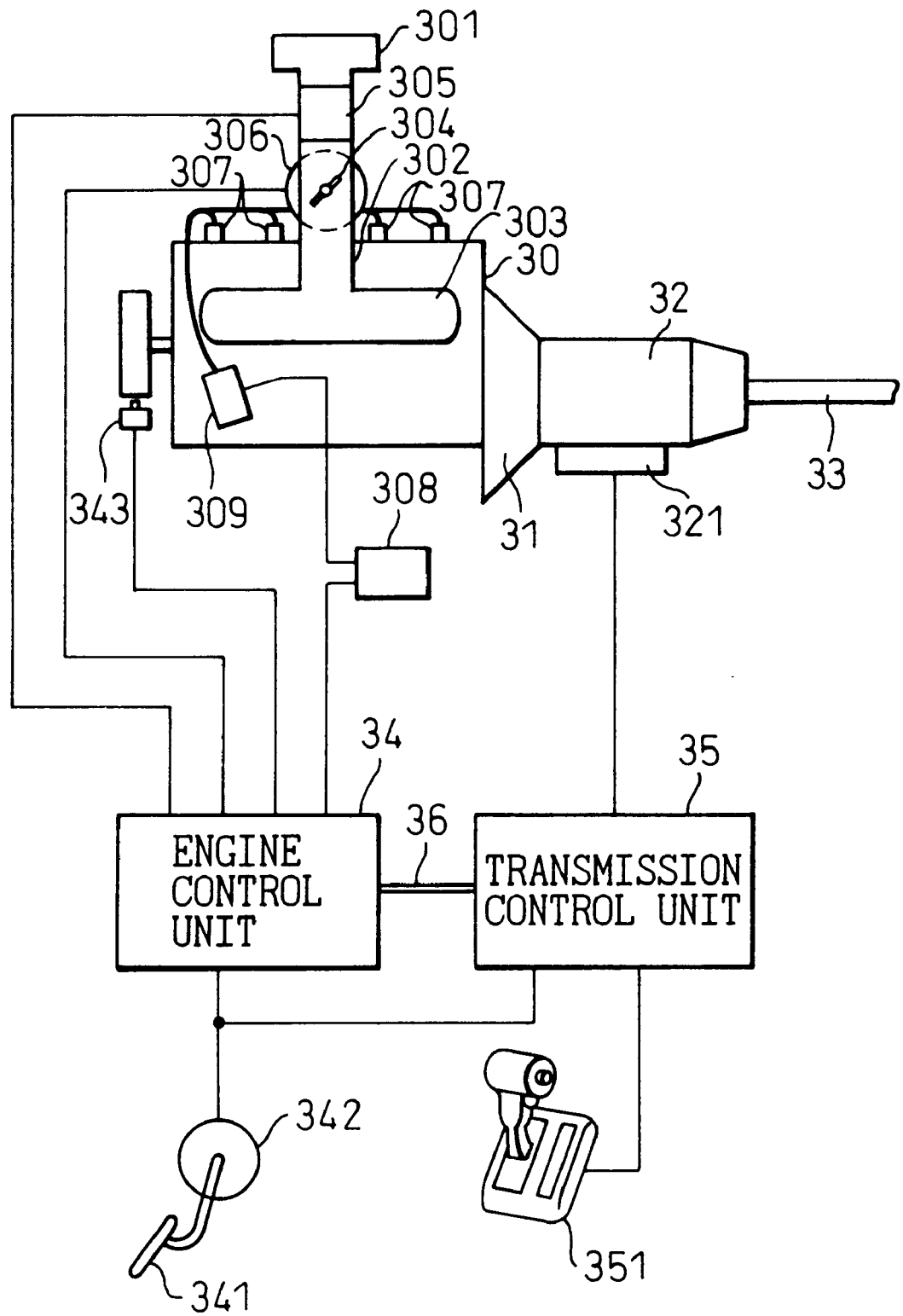
FIG. 3 is a diagram showing the configuration of an embodiment.

FIG. 3 is a diagram showing the configuration of an apparatus for controlling a driving power according to one embodiment of the present invention. A torque produced by an engine 30 is transmitted to a drive shaft 33 via a torque converter 31 and an automatic transmission 32.

Intake air drawn through an air cleaner 301 is supplied to the engine 30 via an air intake pipe 302 and an intake manifold 303, and the quantity of intake air supplied to the engine is controlled by regulating the opening of a throttle valve 304 and is detected by an air flow meter 305.

A spark plug 307 is fitted into the top of each cylinder of the engine 30. A high voltage ignition signal generated by an ignition coil 308 is delivered by a distributor 309 to each spark plug 307 to ignite an air-fuel mixture in the cylinder.

An engine ignition timing and a throttle valve opening are controlled by an engine control unit 34, while an operation of the automatic transmission is controlled by a transmission control unit 35.

The engine control unit 34 outputs an ignition command signal to the ignition coil 308 every ignition timing, and also outputs a throttle valve opening signal to an actuator 306 which actuates the throttle valve 304.

The transmission control unit 35 outputs a shift command to a solenoid valve 321 of the automatic transmission 32, and the condition of the automatic transmission 32 is fed back to the transmission control unit 35.

The engine control unit 34 and the transmission control unit 35 are microcomputer systems which are linked each other by a communication line 36 for transferring information between them.

The amount of depression of an accelerator pedal 341 for operating the throttle valve is detected by an accelerator sensor 342, and shift is sent to the engine control unit 34 as well as to the transmission control unit 35. The shift position of a shift control lever 351 is sent to the transmission control unit 35.

Furthermore, an engine speed sensor 343 is provided to detect the engine speed. The output of the sensor is sent to the engine control unit 34.

Figure 4:
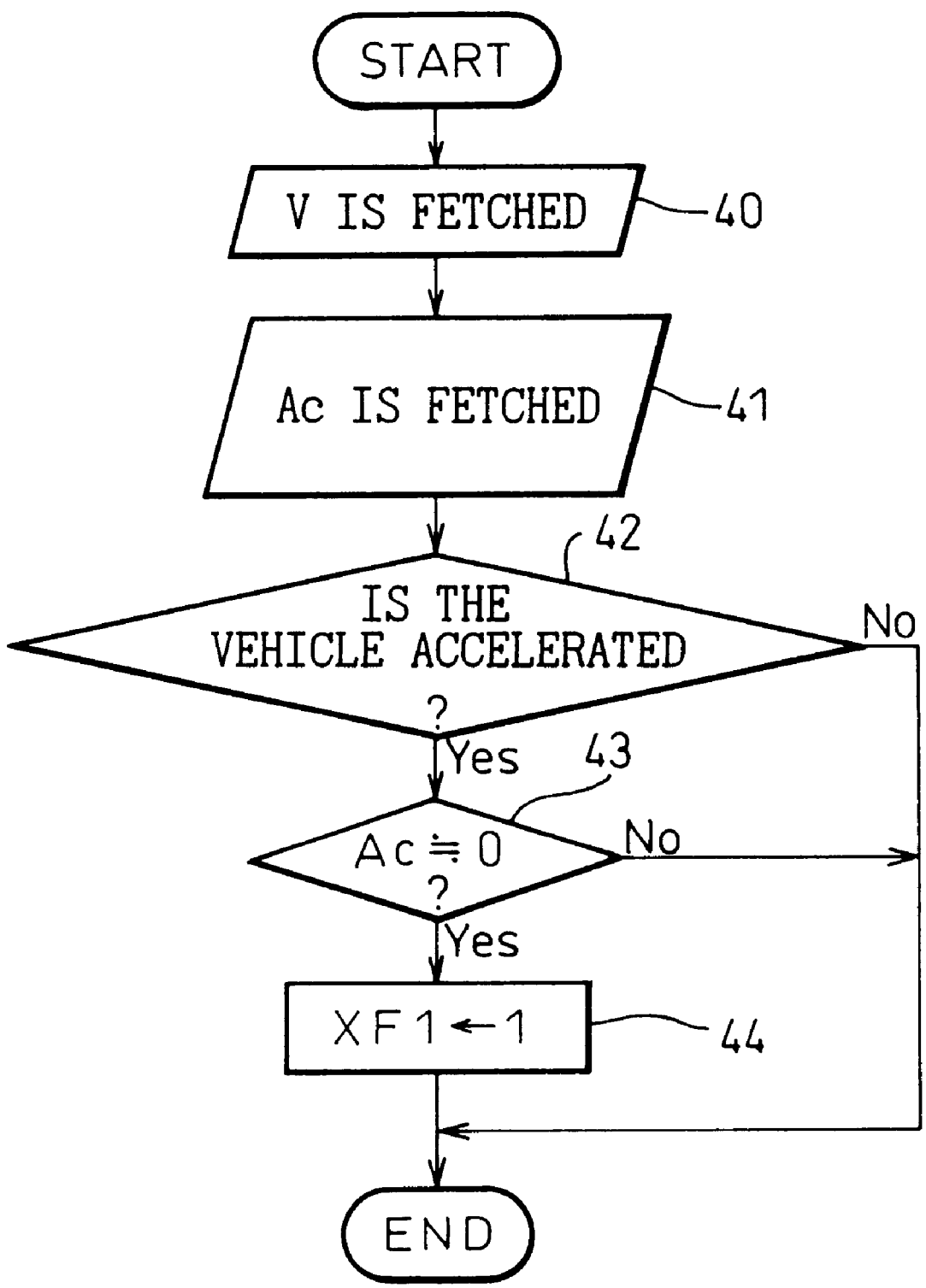
FIG. 4 is a flowchart of a first specific downshift command routine.

FIG. 4 is a flowchart of a first specific downshift command routine performed in the engine control unit 34. At step 40, vehicle speed V is fetched, and at step 41, the amount of depression of the accelerator pedal 341 Ac is fetched.

At step 42, it is determined whether or not the vehicle is accelerated. This can be determined by checking if the vehicle speed V is increasing continuously over a predetermined interval.

When the determination at step 42 is affirmative, that is, when it is determined that the vehicle is being accelerated, it is determined whether or not the amount of depression of the accelerator pedal 341 Ac is nearly zero at step 43.

When the determination at step 43 is affirmative, that is, when the accelerator pedal 341 is not depressed, the control proceeds to step 44 where a first downshift flag XF1 is set to "1" in order to issue a downshift command to the automatic transmission 32 via the communication line 36 and the transmission control unit 35. After that, the routine is terminated.

Conversely, when the determinations at step 42 and 43 are negative, that is, when it is determined that the vehicle is not accelerated and that the accelerator pedal 341 is being depressed, the routine is directly terminated.

Figure 5:
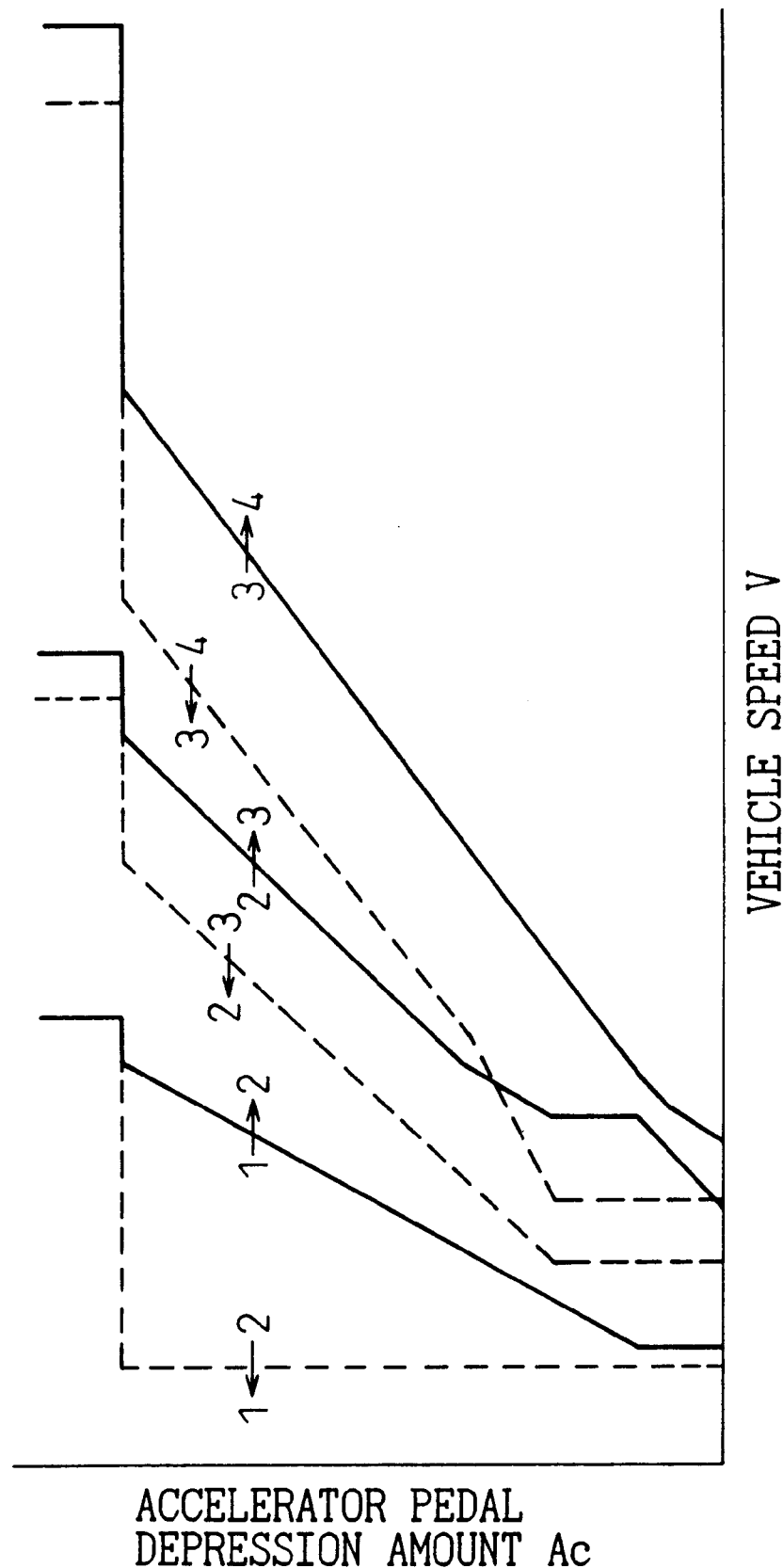
FIG. 5 is a diagram showing an example of a shift pattern.

FIG. 5 shows an example of a shift pattern stored in the transmission control unit. The vehicle speed V is plotted along the abscissa, and the amount of depression of the accelerator pedal 341 Ac is plotted along the ordinate. Solid lines are used for upshift and dashed lines for downshift.

When the specific downshift command routine is not applied, upshifting is performed when the vehicle speed V is increasing though the amount of depression, Ac, of the accelerator pedal 341 is nearly zero.

Conversely, when the specific downshift command routine is applied, a forced downshift command is issued when the vehicle speed V is increasing though the amount of depression, Ac, of the accelerator pedal is nearly zero. For example, when driving in fourth gear, a downshift to third gear is performed.

Figure 6:
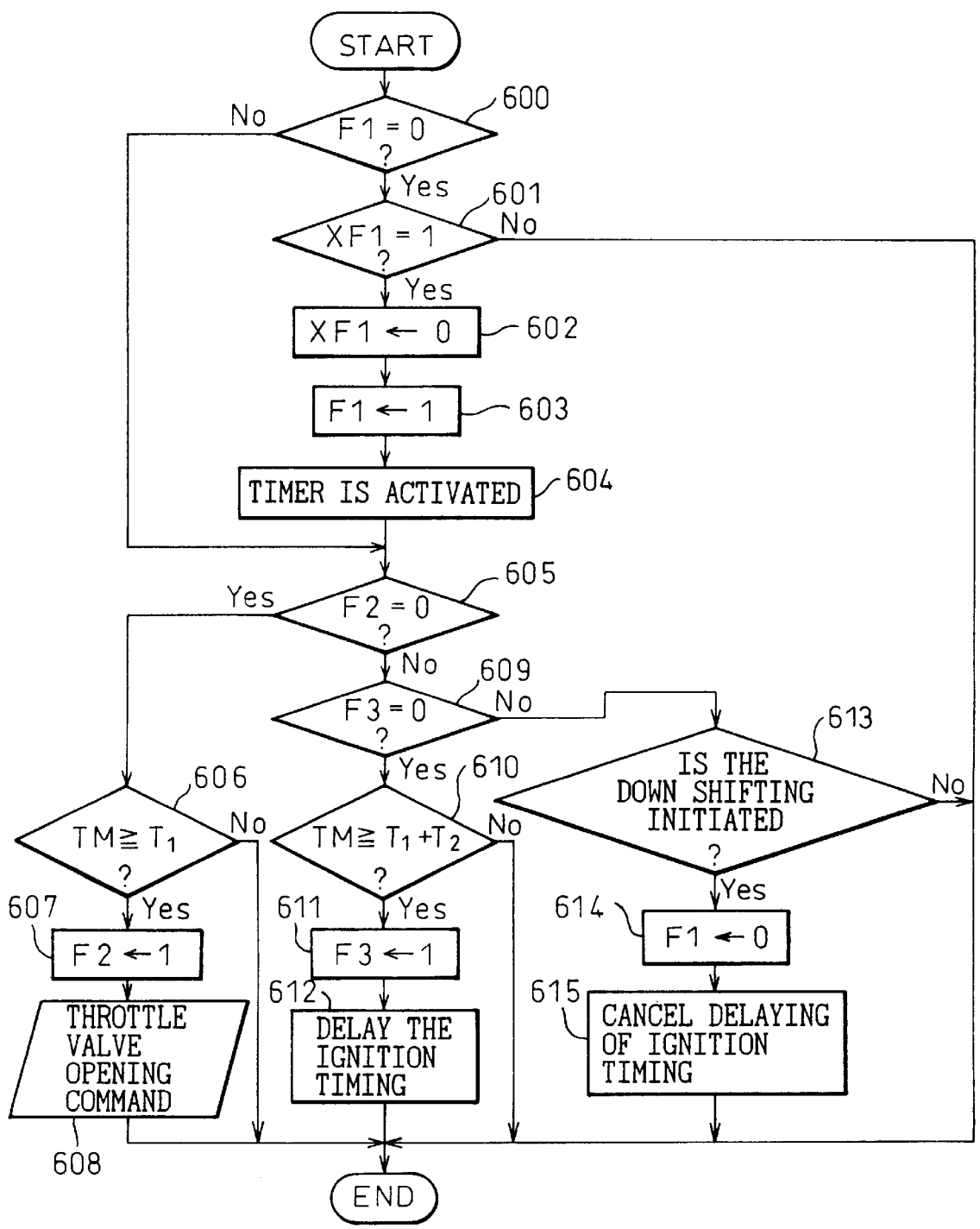
FIG. 6 is a flowchart of a first gear-shift control routine.

FIG. 6 is a flowchart of a first gear-shift control routine performed in the engine control unit 36. First, it is determined whether or not a flag F1 indicating functioning of a timer TM is reset (F1=0) at step 600. Since the flag F1 is initially reset, the determination at step 600 is affirmative, and the control proceeds to step 601. At step 601, it is determined whether or not the first downshift flag XF1 (XF1=1) indicating that the downshift command is issued from the specific downshift command routine is set. If the downshift command is not issued, this routine is terminated because the determination at step 601 is negative.

When the determination at step 601 is affirmative, that is, when the downshift command is issued, the first downshift flag XF1 is reset to 0 at step 602, the flag F1 is set to 1 at step 603, the timer TM is activated at step 604, and the gear-shift control after step 605 is executed.

Conversely, when the determination at step 600 is negative, that is, when the timer TM is activated and the flag F1 is set to 1, the control jumps to step 605.

It is determined whether or not a flag F2 indicating the issuance of a throttle valve opening command is reset (F2=0) at step 605.

When the determination at step 605 is affirmative, that is, when the throttle valve opening command is not issued, it is determined whether or not the timer TM has reached a predetermined time $T_1$ at step 606.

The time $T_1$ here is set sufficiently shorter than the time from the issuance of the downshift command to the start of the actual downshift, so that the engine output is actually increased by opening the throttle valve before the downshift is actually initiated.

When the determination at step 606 is affirmative, that is, when the time $T_1$ has elapsed after the issuance of the downshift command, the flag F2 is set to 1 at step 607, and the routine is terminated after a throttle valve opening command is controlled at θ, at step 608. The opening angle $θ_1$ is so determined as to increase the engine output torque by ΔT in order to compensate for torque drop ΔT which may occur at the completion of the downshift.

Conversely, when the determination at step 606 is negative, that is, when the time $T_1$ has not elapsed after the issuance of the downshift command, the routine is immediately terminated.

When the determination at step 605 is negative, that is, when the throttle valve opening command is already issued, it is determinate whether or not a flag F3 indicating the ignition timing being delayed is reset (F3=0) at step 609.

When the determination at step 609 is affirmative, that is, when the ignition timing is not delayed, it is determined whether or not the timer TM becomes longer than the time $T_1+T_2$.

Note, the time $T_2$ is the time from the opening of the throttle valve to the start of the increase of the engine output, and is determined as a function of the engine operating condition, for example, the engine speed Ne detected by the engine speed sensor 363.

When the determination at step 610 is affirmative, that is, when the time $T_1+T_2$ has elapsed after the issuance of the throttle valve opening command, the flag F3 is set to 1 at step 611, and the base ignition timing TR is delayed by a predetermined delaying timing ΔTL to determine the ignition timing TI at step 612 before the routine is terminated.

$$TI=TR-ΔTL$$

As is known, the base ignition timing TR is determined as a function of the engine speed Ne and the intake air flow rate Qa detected by the air flow meter 305.

$$TR=TR(Ne, Qa)$$

The delaying timing ΔTL is determined so as to prevent the actual engine output torque increasing by ΔT when the throttle valve is opened by opening angle $θ_1$.

When the determination at step 610 is negative, that is, when the time $T_1+T_2$ has not elapsed after the issuance of the throttle valve opening command, the routine is immediately terminated.

When the determination at step 609 is negative, that is, when the ignition timing has already been delayed, the control proceeds to step 613 where it is determined whether or not the downshifting of the automatic transmission 32 is already initiated. When the downshifting is initiated, a signal indicating that the downshift has been initiated is fed back from the automatic transmission 32.

When the determination at step 613 is affirmative, that is, when the downshifting has already been initiated, the flag F1 is reset at step 614, and delaying of the ignition timing is cancelled, that is, ignition timing TI is set back to the base ignition timing TR, before the routine is terminated.

$$TI=TR$$

Note, when the determination at step 613 is negative, that is, when the downshifting has not been initiated yet, the routine is immediately terminated.

Figure 7:
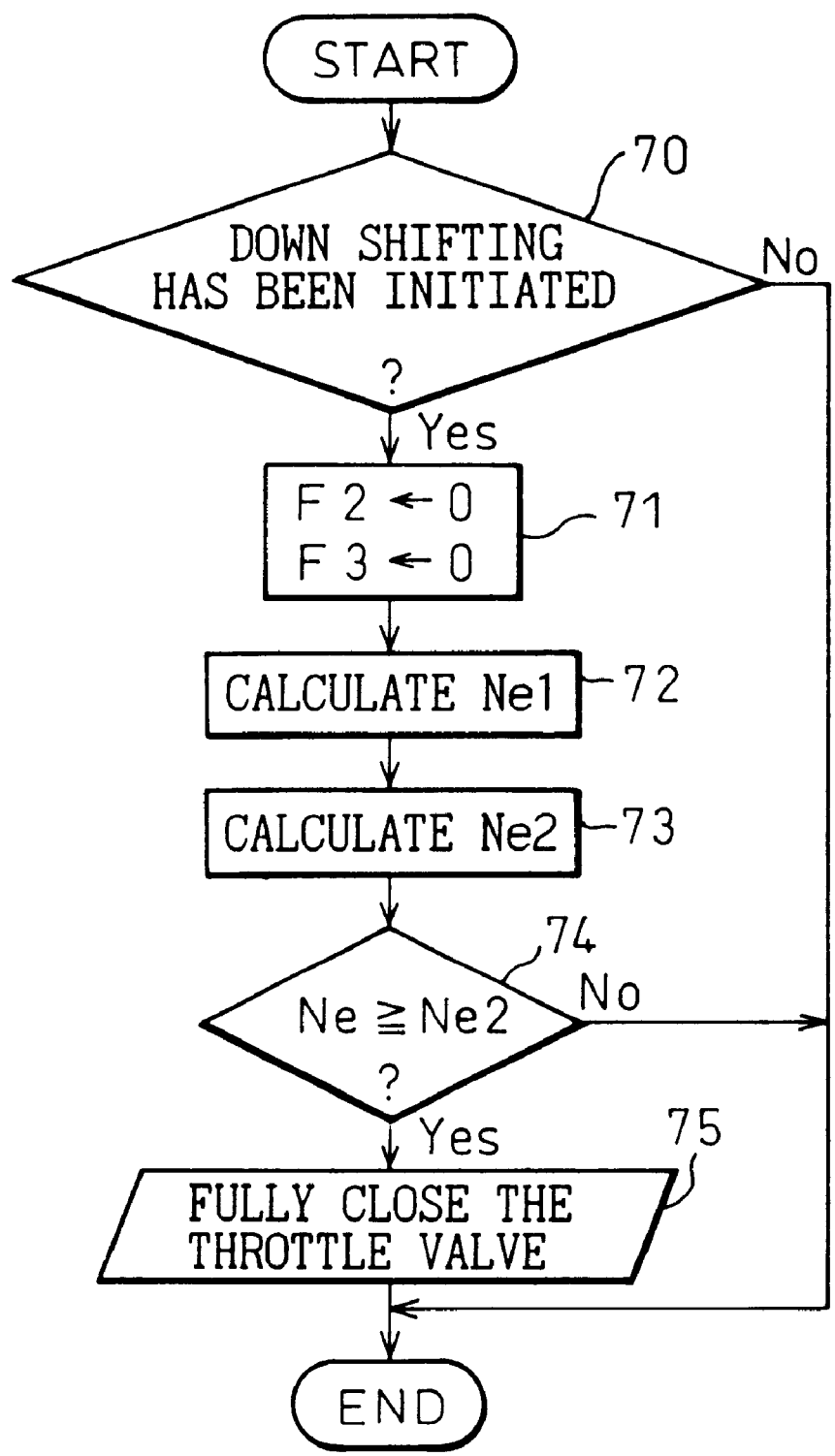
FIG. 7 is a flowchart of a first processing routine after gear-shift initiation.

FIG. 7 is a flowchart of a first post-gear-shift routine, performed in the engine control unit 34. At step 70, it is determined whether or not the downshifting has actually been initiated, and the routine is immediately terminated when the determination at step 70 is negative.

When the determination at step 70 is affirmative, that is, when the downshifting has been initiated, the flags F2 and F3 are reset at step 71 before proceeding to step 72. At step 72, engine speed Ne1 after the downshifting is estimated based on the vehicle speed V, the engine speed Ne before the initiation of the downshifting, gear ratios before and after the downshifting, etc. To restore the engine torque increased in downshifting, to the level before it was increased, when the downshift is completed, an engine speed Ne2 at the time when the throttle valve is closed is estimated in accordance with this engine speed Ne1 and the throttle valve opening $θ_1$.

At step 74, it is determined whether or not the present engine speed N has reached the prescribed engine speed Ne2. When the determination at step 74 is negative, the routine is terminated, but when the determination is affirmative, the control proceeds to step 75 where throttle valve closing command is issued, and the routine is terminated. To determine the engine speeds Ne1 and Ne2 at steps 72 and 73, a prescribed map may be used.

Figure 8:
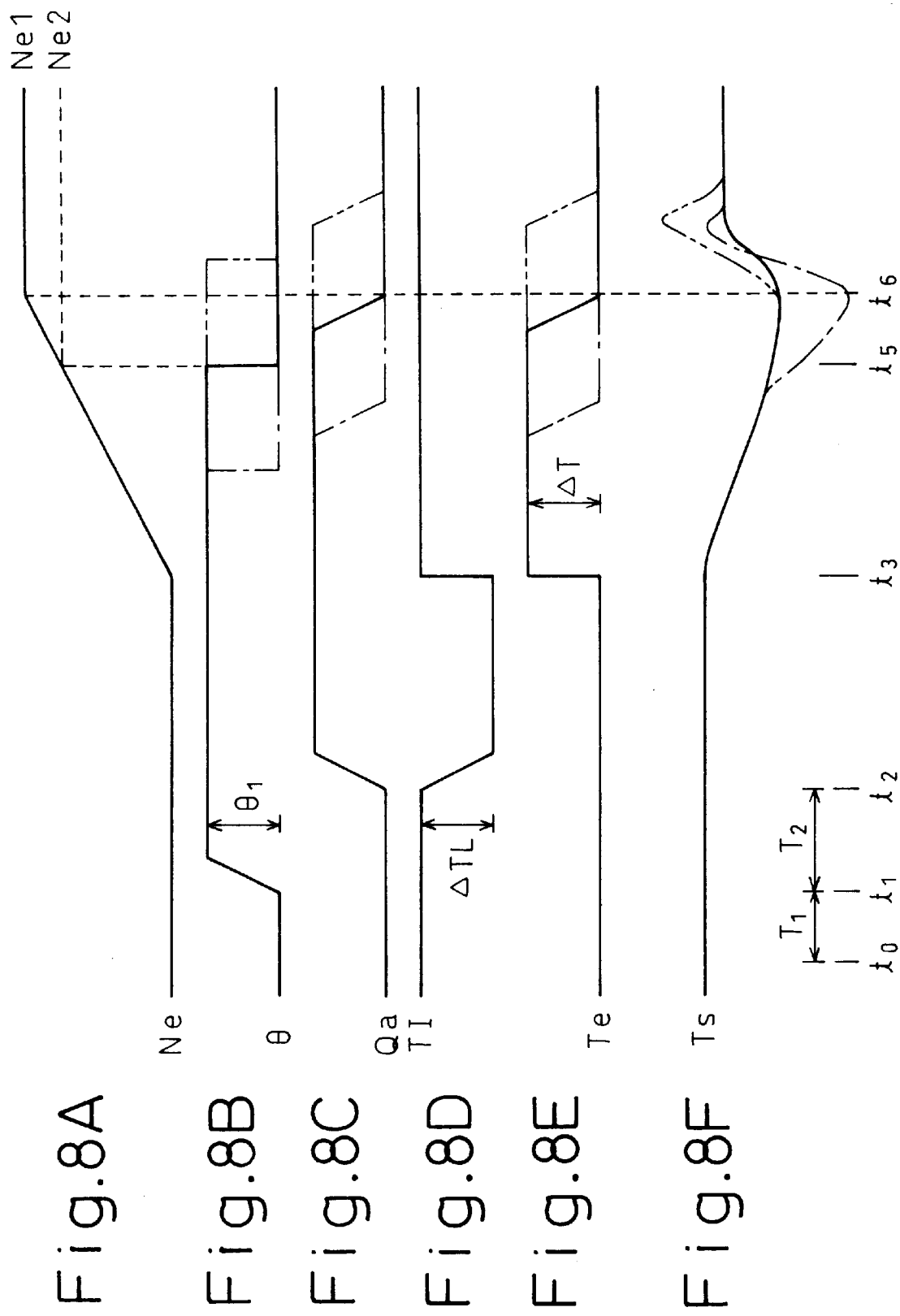
FIGS. 8A–8F are first diagrams for explaining the operation of the apparatus.

FIG. 8 is a first diagram for explaining the operation when a driving power of the vehicle is controlled as described above. An engine speed Ne, a throttle valve opening θ, an intake air flow rate Qa, an ignition timing TI, an engine torque Te, and shaft torque Ts are shown in this order from the top to the bottom. Time is plotted along the abscissa.

In this case, the downshift command is issued to the automatic transmission at time $t_0$.

At time $t_1$, when the time $T_1$ has elapsed after time $t_0$, the throttle valve is opened by $θ_1$, and at time $t_2$, when the time T2 has elapsed after time $t_1$, the amount of the intake air supplied to the engine actually begins to increase.

However, since the ignition timing is delayed at time $t_2$, the change of the engine output torque Te is suppressed. This prevents the occurrence of a torque shock due to the lag from the time the engine speed Ne begins to increase after the downshifting to the time the engine output torque begins to increase by the opening of the throttle valve.

When the downshifting of the automatic transmission is initiated at time $t_3$ in response to the downshift command issued at time $t_0$, the engine speed begins to increase, and at the same time, the ignition timing retarding is cancelled, so that the engine output torque we increases while the shaft torque Ts decreases smoothly, and the deterioration of drivability is also alleviated.

The downshifting is completed at time $t_6$. However, as shown by single-dot dashed lines, if the output torque once increased is restored to its initial level before the completion of the downshifting because the throttle valve is closed early, the shaft torque Ts drops sharply at the end of the downshifting to cause a torque shock. Conversely, as shown by double-dot dashed lines, if the output torque once increased is restored to its initial level after the completion of the downshifting because the throttle valve is closed late, the shaft torque Ts increases abruptly after the end of the downshifting also to cause a torque shock.

According to the flowchart of the first post-gear-shift routine shown in FIG. 7, a torque shock can be restrained by closing the throttle valve at time t5 when the engine speed reaches Ne2 to restore the output torque to the original level.

Figure 9:
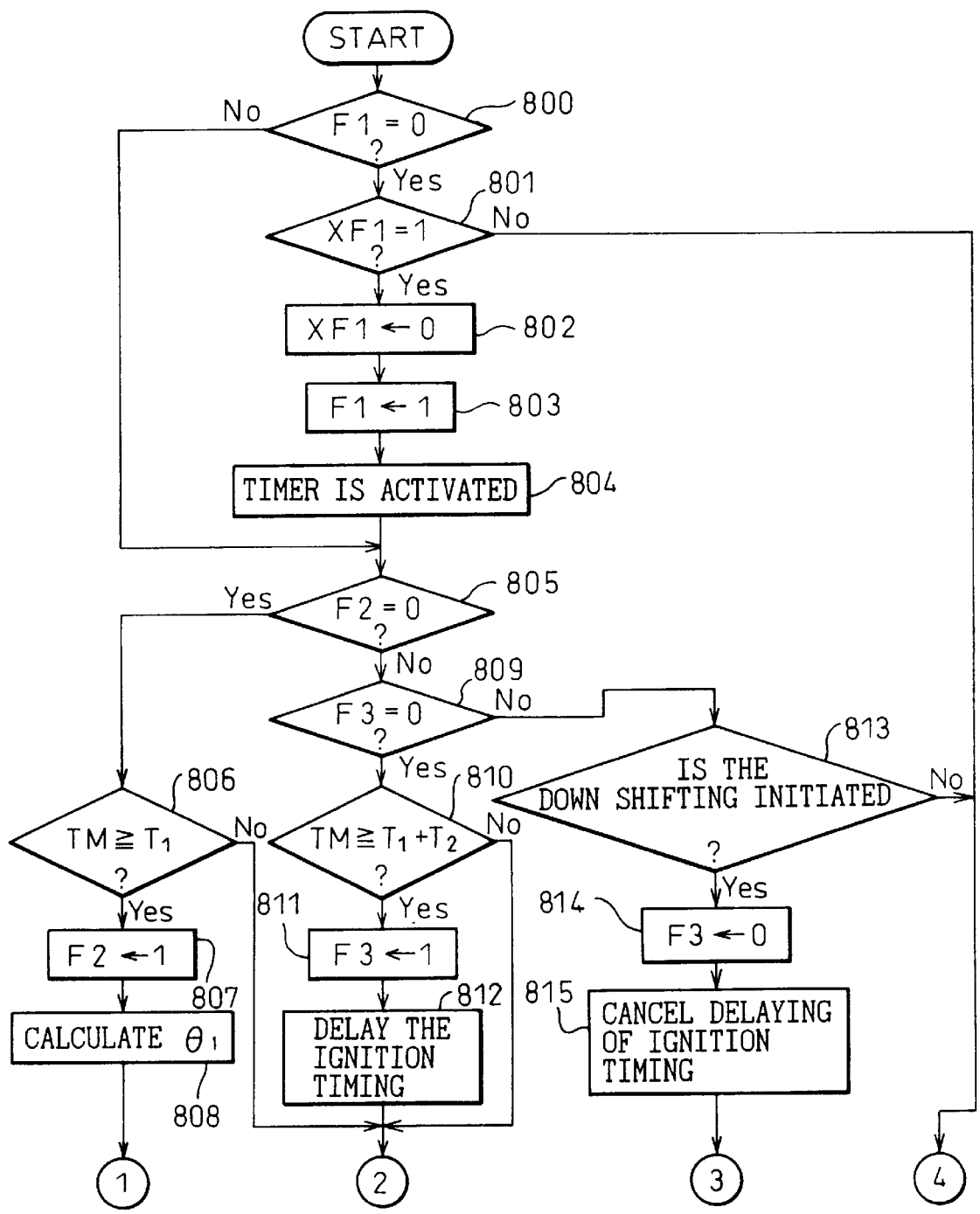
FIG. 9 is a flowchart (1/2) of a second gear-shift control routine.
Figure 10:
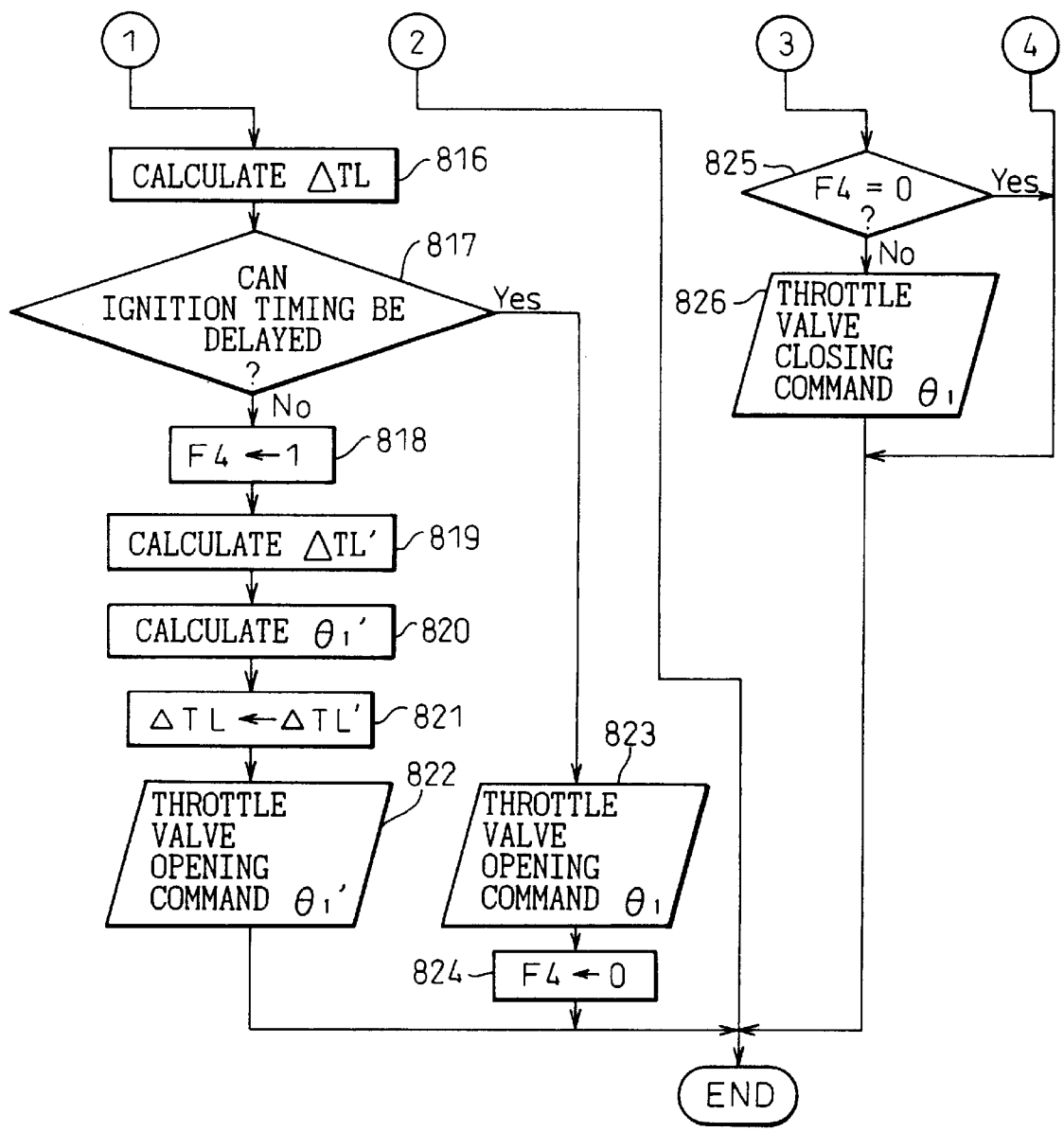
FIG. 10 is of a flowchart (2/2) of the second gearsh. shift control routine.

FIGS. 9 and 10 show a flowchart of a second gear-shift control routine, which is different from the first flowchart shown in FIG. 6. The following description deals only with differences from the first flowchart. The second routine the same as the first routine is initiated when the first downshift flag XF1 is set by the specific downshift command routine. In this routine, after setting the flag F2 to 1 in step 807, the throttle valve opening $\theta_1$ is computed at step 808 to compensate for the torque drop $\Delta T$ caused at the completion of the downshifting, and the ignition timing delaying amount $\Delta TL$ is computed to compensate for the torque $\Delta T$.

It is determined whether or not the ignition timing delaying amount $\Delta TL$ can be further delayed since it does not exceed the misfire limit at step 817. When the determination at step 817 is affirmative, the valve opening command of the opening $\theta_1$ is issued to the throttle valve at step 823, a flag F4, which is described in detail later is reset at step 824, and the ignition timing is delayed by $\Delta TL$ at step 812 as the first routine.

Conversely when the determination at step 817 is negative, that is, when misfiring is caused if the ignition timing is delayed by $\Delta TL$, the control proceeds to step 818 where the flag F4 is set to 1.

A maximum ignition timing delaying amount $\Delta TL'$ that does not cause misfiring is computed based on the present engine operating condition at step 819, and a throttle valve opening $\theta_1'$ that is required to compensate for a torquedecrease due to the maximum ignition timing delaying amount $\Delta TL'$. At step 821, the maximum ignition timing delaying amount $\Delta TL'$ is set as the ignition timing delaying amount $\Delta TL$ to be used at step 812, and a valve opening command $\theta_1'$ is issued to the throttle valve at step 822.

After the ignition timing delaying is cancelled at step 815, the control proceeds to step 825 where it is determined whether or not the flag F4 is reset (F4=0). The flag F4 is reset when, as earlier described, the valve opening command $\theta_1$ is issued to the throttle valve to compensate for the torque drop $\Delta T$ caused at the completion of the downshifting (step 823), and is set when the valve opening command $\theta_1'$ which is riot sufficient to compensate for the torque drop $\Delta T$ (step 822) is issued.

When the determination at step 825 is affirmative, the routine is terminated, but when the determination at step 825 is negative, the control proceeds to step 826 where the valve opening command $\theta_1$ is issued to the throttle valve to increase the throttle valve opening by $\theta_1 - \theta_1'$, before the routine is terminated. When downshifting is initiated after this routine, the post-gear-shift routine shown in FIG. 7 is executed.

Figure 11:
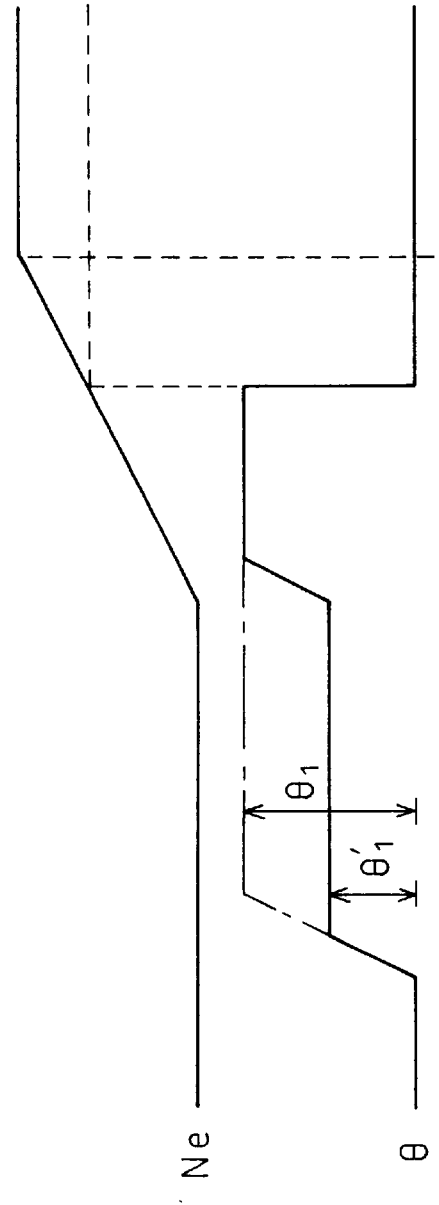
FIGS. 11A–11E are second diagrams for explaining the operation of the apparatus.

FIG. 11 is a second diagram for explaining the operation when the above-described driving power control is performed. Only the differences from FIG. 8 will be described below. At time $t_1$, a provisional throttle valve opening $\theta_1$ required to compensate for a torque drop caused at the completion of a downshifting is computed. If an ignition timing delaying amount $\Delta TL$ required to compensate for the torque drop is not beyond a misfire limit, a throttle valve opening $\theta_1$ is issued at time $t_1$ in the same way as the first gear-shift control routine shown in FIG. 6, and an ignition timing is delayed by the ignition timing delaying amount.

However, if the thus calculated ignition timing delaying amount $\Delta TL$ exceeds the misfire limit, the ignition timing delaying amount is limited to the maximum value $\Delta TL'$ that does not cause misfire to prevent the occurrence of misfire, and the throttle valve opening is limited to the opening angle $\theta_1'$ required to compensate for a torque drop due to the delaying of the ignition timing. The throttle valve is opened at time $t_1$, and the ignition timing is delayed at time $t_2$.

Thereafter, at time $t_3$ when the downshifting is initiated, the ignition timing delaying is cancelled and the throttle valve is further opened to $\theta_1$. In this way, though the engine torque cannot be increased by $\Delta T$ at the initiation of the downshifting, the engine torque can be increased during the downshifting.

In this flowchart, the ignition timing delaying amount $\Delta TL'$ is set as the maximum ignition timing delaying amount that does not cause misfiring, but this does not restrict the present invention, and the only requirement is that the delaying amount be set within the misfiring limit. Further, the throttle valve opening before delaying the ignition timing is not necessarily reduced to the opening angle $\theta_1'$ which corresponds to the actual ignition timing delaying amount $\Delta TL'$, and if the opening is set at least smaller than the provisional opening angle $\theta_1$, it is possible to reduce the torque increase associated with the reduced ignition timing delaying amount $\Delta TL'$ before the initiation of the downshifting.

Figure 12:
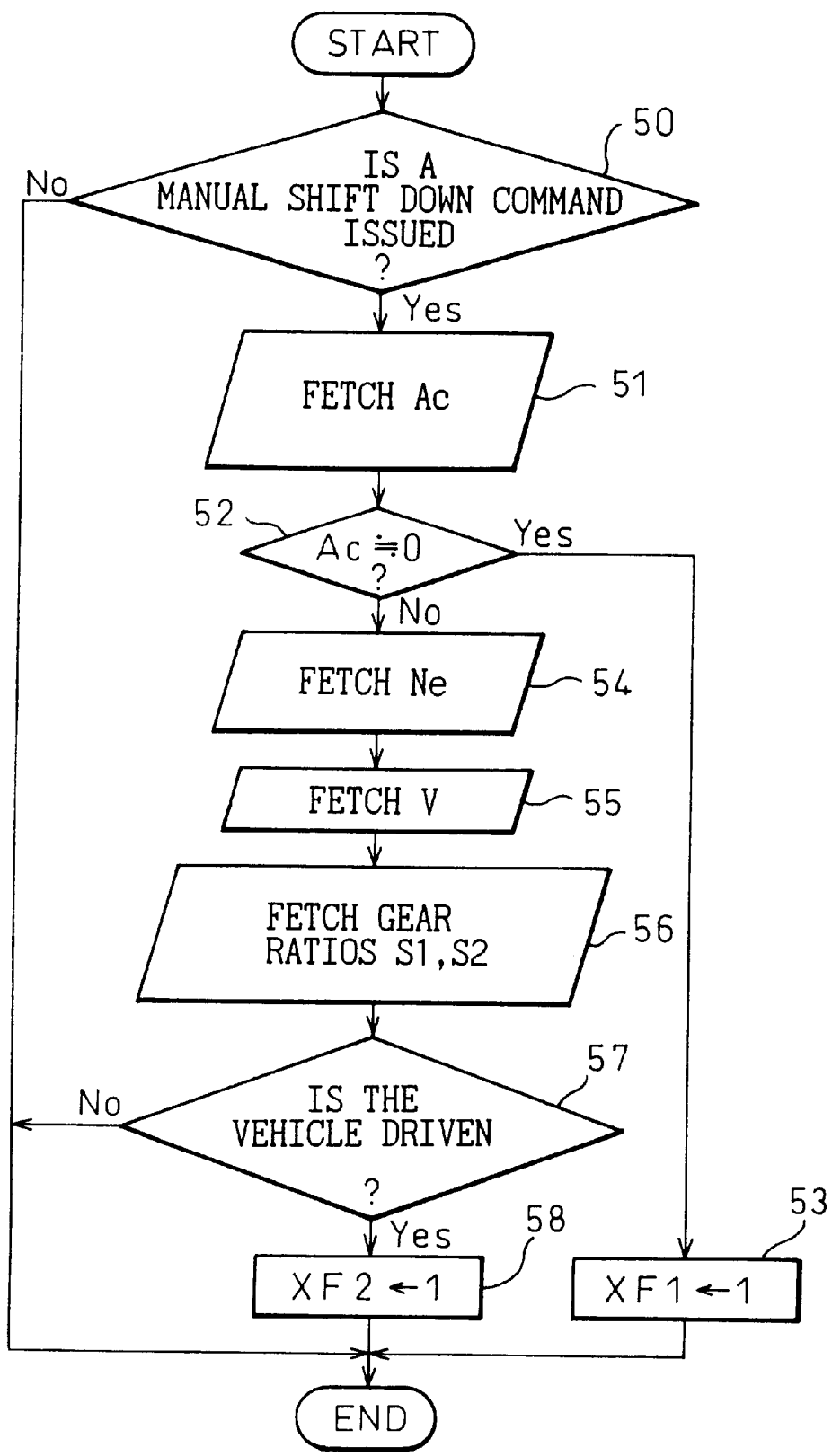
FIG. 12 is a flowchart of a second specific downshift command routine.

FIG. 12 shows a flowchart of a second specific downshift command routine, which is different from the first routine shown in FIG. 4. The second routine will be explained below. At step 50, it is determined whether or not a manual downshift command indicating that the driver has shifted the selector lever into a lower gear position has been issued. When the manual downshift command is not issued, the routine is terminated, but when the determination at step 50 is affirmative, the control proceeds to step 51 where the amount of depression of the accelerator pedal 341 Ac is fetched.

At step 52, it is determined whether or not the amount of depression of the accelerator pedal 341 Ac is nearly zero. If the determination is affirmative, the first downshift flag XF1 is set to 1 at step 53. That is, if a manual downshift is performed when the accelerator pedal is not depressed, since excessive engine braking force is caused as the previously described automatic downshifting of the automatic transmission, the first downshift flag XF1 is set to 1 and the previously described gear-shift control routine is executed.

Conversely, when the determination at step 52 is negative, that is, when the accelerator pedal is being depressed, the engine speed Ne is fetched at step 54. Then, the vehicle speed V is fetched at step 55, and gear ratios S1 and S2 before and after the manual downshifting respectively are fetched at step 56.

It is determined at step 57 whether or not the vehicle has transferred from a driving condition before a downshifting to a driven condition after the downshifting in accordance with the depressed amount of the accelerator pedal Ac, the engine speed Ne, the vehicle speed, and the gear ratios $S_1$ and $S_2$ before and after the manual downshifting respectively. When the determination at step 57 is negative, that is, when the vehicle has not transferred to the driven condition, this routine is terminated. Conversely, when the vehicle has transferred to the driven condition, a second downshift flag XF2 is set to 1 because an excessive braking force is caused.

Figure 13:
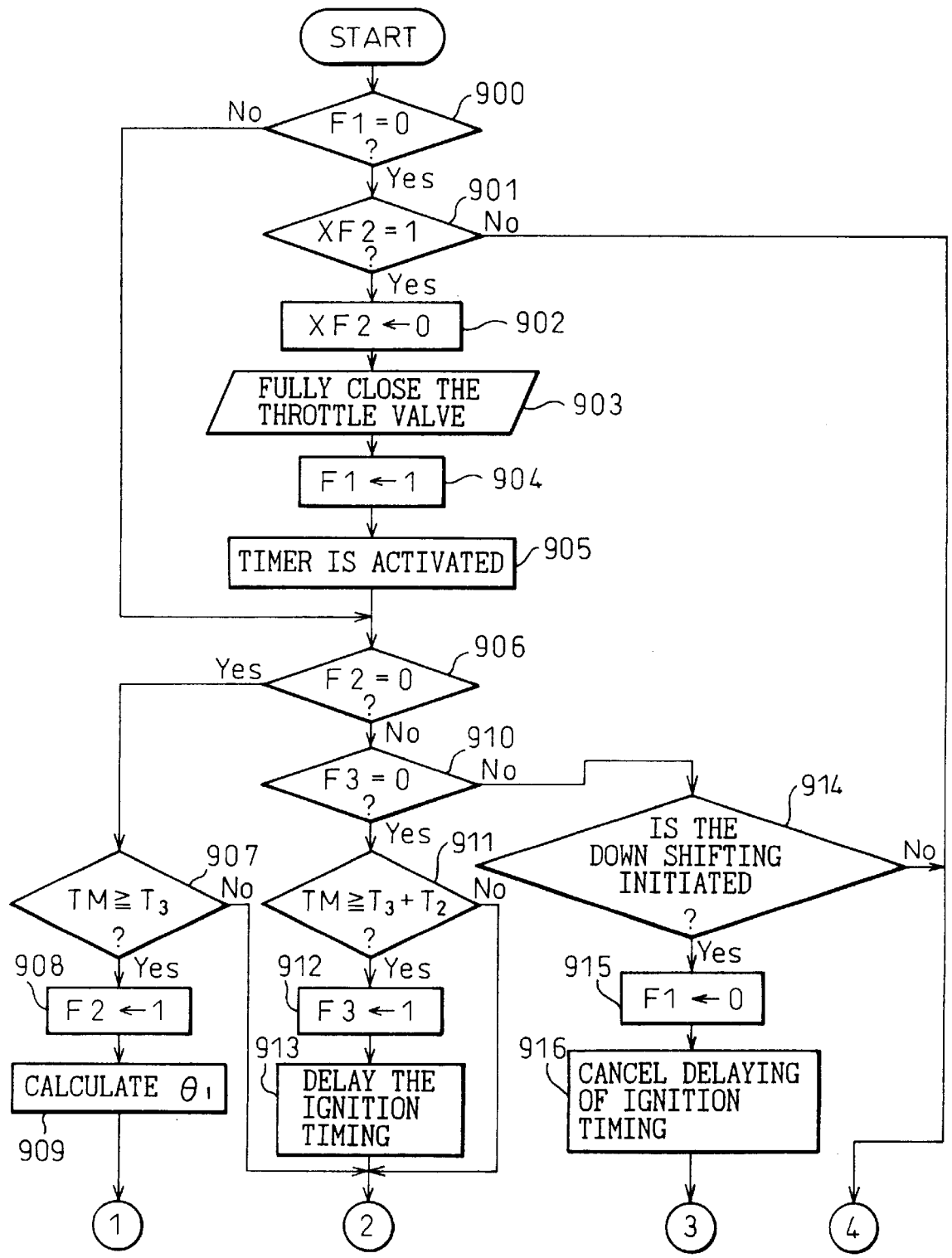
FIG. 13 is a flowchart (1/2) of a third gear-shift control routine.
Figure 14:
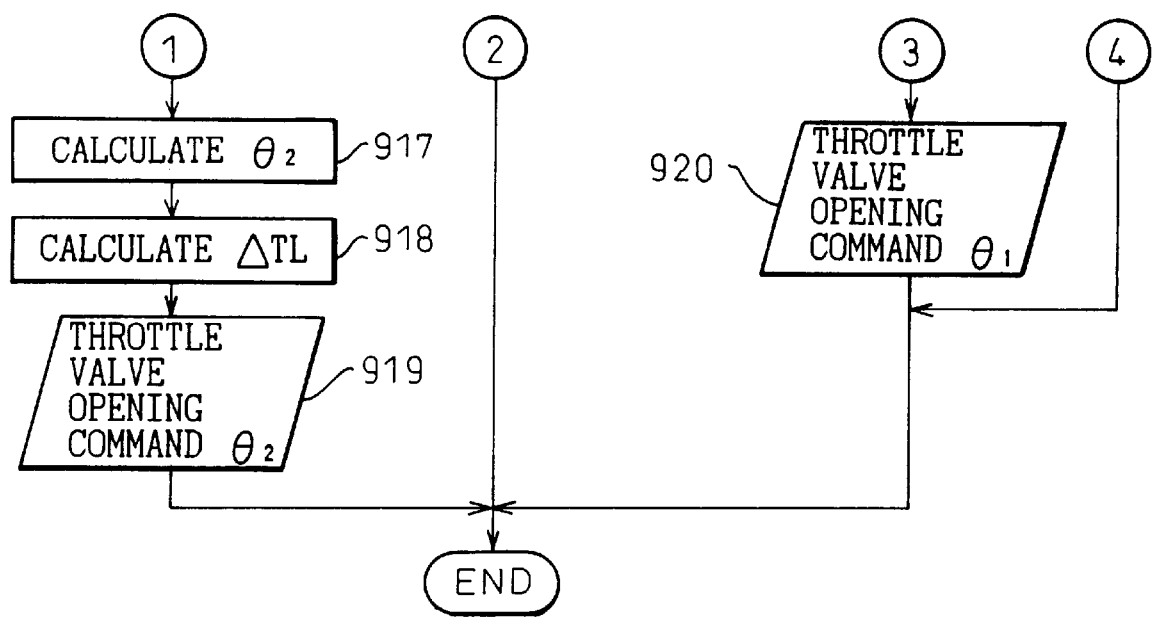
FIG. 14 is a flowchart (2/2) of the third gear-shift control routine.

FIGS. 13 and 14 show a flowchart of a third gear-shift control routine initiated when the second downshift flag XF2 is set. The following description deals only with differences from the second gear-shift control shown in FIGS. 9 and 10. In the third routine, after resetting the second downshift flag XF2 at step 902, a valve closing command is issued to the throttle valve at step 903, to fully close the throttle valve from the present throttle angle $\theta_3$.

At step 907, it is determined whether or not the timer TM counts up to a predetermined interval $T_3$. Note, the interval $T_3$, like the previously described interval $T_1$, is set sufficiently shorter than the interval from the issuance of the downshift command to the initiation of the actual downshift, to ensure that the engine output increase resulting from the throttle valve opening will be complete by the time the downshifting is actually initiated. The time is set as measured after the engine torque has sufficiently decreased by the throttle valve closing at step 903.

The flag F2 is set to 1 at step 908, and the opening $\theta_1$ from the full-closed position of the throttle valve required to compensate for the torque drop $\Delta T$ at the completion of the downshifting is calculated. The opening $\theta_1$ is multiplied by a prescribed factor (for example, 0.8) to compute the actual throttle valve opening $\theta_2$ at step 917. An ignition timing delaying amount $\Delta TL$ required to compensate for the torque increase due to the throttle valve opening $\theta_2$ at step 918, and the valve opening command $\theta_2$ is issued to the throttle valve at step 919.

When the timer TM counts up to the interval $T_3+T_2$ at step 911 after the throttle valve is opened, the ignition timing is delayed by the delaying amount $\Delta TL$ at step 913. Note, the time $T_2$, like the previously described time $T_3$, is an interval from the moment the throttle valve is opened to the moment the engine output actually begins to increase, and is determined as a function of the engine operating condition, for example, the engine speed Ne detected by the engine speed sensor 363.

After the ignition timing delaying is cancelled at step 916, the valve opening command $\theta_1$ is issued to the throttle valve to increase the throttle valve opening by $\theta_1-\theta_2$ at step 920, and the routine is terminated.

Figure 15:
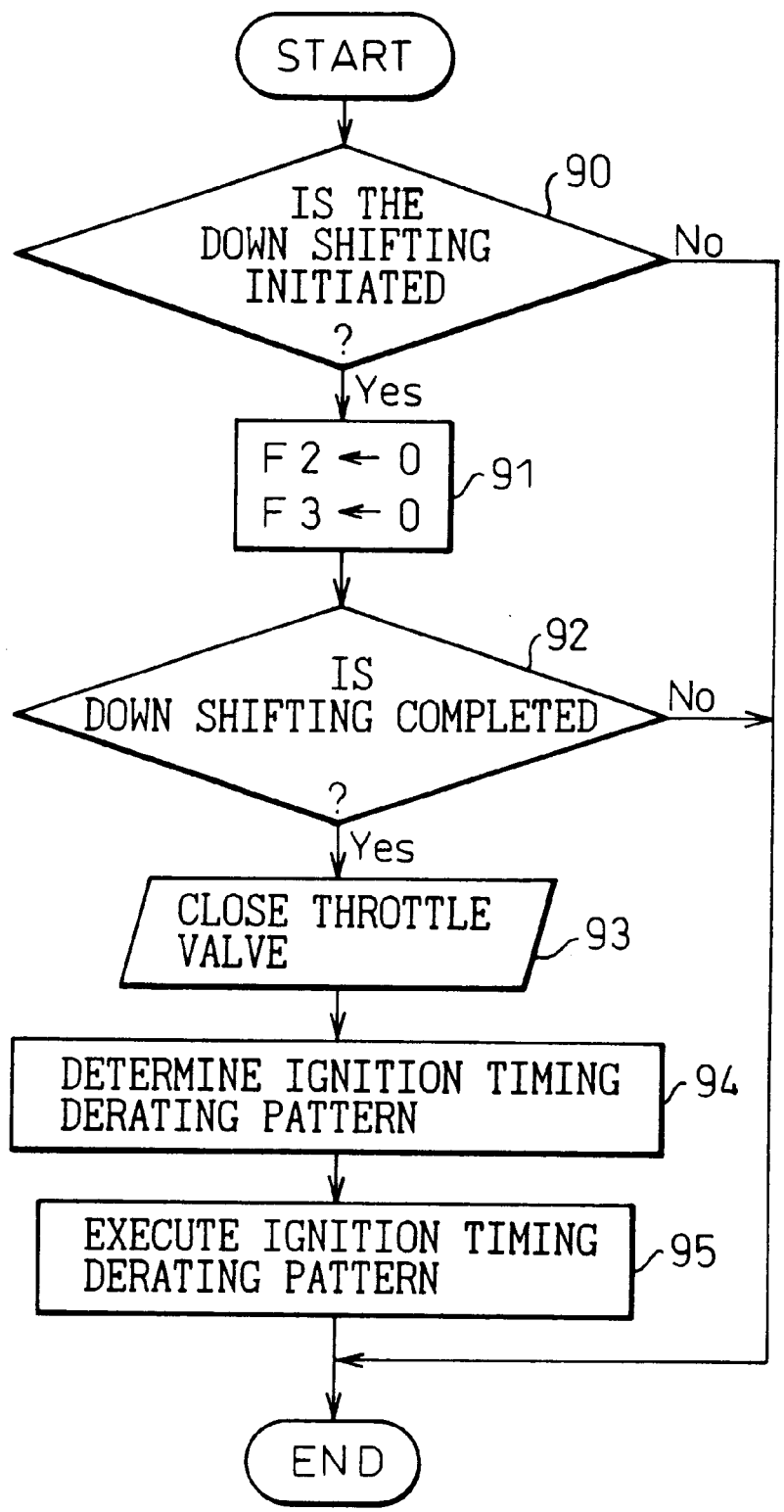
FIG. 15 is a flowchart of a second processing routine after initiating a gear-shift operation.

FIG. 15 is a flowchart of a second post-gear-shift routine executed in the engine control unit 34, which is different from the first flowchart shown in FIG. 7. Only the differences from the first routine will be described below. In the second routine, after resetting the flags F2 and F3 at step 91, it is determined whether or not the downshifting is completed or not at step 92. When the determination at step 92 is negative, the routine is terminated. Conversely, when it is determined that the downshifting is completed, the control proceeds to step 93, where a valve closing command $(\theta_1-\theta_3)$ is issued to the throttle valve, to return the throttle valve opening to that at the time the second downshift command was issued. At step 94, an ignition timing delaying pattern to control the engine torque is gradually decreased by closing the throttle valve to that at the time when the second downshift command is issued.

FIG. 16 is a third diagram for explaining the operation when the above-described vehicle output control is performed. The engine speed Ne, throttle valve opening $\theta$, intake air quantity Qa, ignition timing TI, engine torque Te, and shaft torque Ts are shown in this order from the top to the bottom. Time is plotted along the abscissa.

The following assumes the case where the downshift command is issued to the automatic transmission at time $t_0$.

At time $t_0$, the throttle valve is closed at the same time the downshift command is issued. As a result, before the initiation of the downshifting, the engine torque Te drops, and so does the shaft torque Ts. This downshifting is to decelerate a vehicle speed where the vehicle is put in a driven condition after the downshifting, and reducing the shaft torque and the decelerating of the vehicle speed before the downshifting does not cause any particular problem.

At time $t_1$, after time $T_3$ has elapsed from time $t_0$, the throttle valve is opened by $\theta_2$, and at time $t_2$ after time $T_2$ has elapsed from time $t_1$, the flow rate of intake air supplied to the engine actually begins to increase. However, since the ignition timing is delayed at time $t_2$, the fluctuation of the engine output torque Te is suppressed. This prevents the occurrence of a torque shock due to the lag between the time the engine speed Ne begins to increase after the downshifting and the time the engine output torque begins to increase by the opening of the throttle valve. At this time, the amount of torque increase associated with the throttle valve opening $\theta_2$ is set smaller than the torque drop $\Delta T$ caused at the completion of the downshifting. By thus reducing the amount of torque required to compensate for the ignition timing delaying, the amount of the ignition timing delaying can also be reduced so as to prevent the occurrence of misfire.

It is difficult to accurately estimate an increase amount of an engine torque because an intake air flow rate increased by opening of the throttle valve fluctuates in practice. Therefore, it is desirable to feed back an ignition timing to maintain the engine torque at the level before downshifting by delaying an ignition timing. Further, it is desirable to make an increasing amount of the engine torque small and to make its fluctuation small, in order to accurately compensate for its fluctuation by delaying the ignition timing. To achieve this, in the flowchart of the third post-gear-shift routine shown in FIGS. 13 and 14, the torque is increased before the initiation of the downshifting by a prescribed percentage of the required torque increase amount $\Delta T$.

When the downshifting of the automatic transmission is initiated at time $t_3$ in response to the downshiLt command issued at time $t_0$, the engine speed begins to increase, and the ignition timing delaying is cancelled at the same time. Then the engine torque rapidly increases by the prescribed percentage of the required torque increase amount, the throttle valve is further opened to $\theta_1$, and a required torque increase can be accomplished while downshifting. By such transmission control, the shaft torque Ts also decreases smoothly, effectively preventing the deterioration of driveability. Further, in this control, the throttle valve is closed before the initiation of the downshifting to reduce the shaft torque. This serves to reduce the amount of shaft torque drop while downshifting. In this way, the torque shock at the time of downshifting can be reduced.

At time $t_6$, the downshifting is completed, upon which the throttle valve is closed to its initial opening and the intake air flow rate gradually decreases. As explained with reference to the diagram of FIG. 8, if the engine torque increase after the completion of the downshifting, a torque shock occurs. According to the second post-gear-shift routine shown in FIG. 15, the ignition timing is delayed to compensate for decreases with a certain delay after the downshifting, thereby offsetting the amount of torque increase after the downshifting and thus preventing the occurrence of such a torque shock.

In the first post-gear-shift routine shown in FIG. 7, the throttle valve is closed before the completion of the downshifting to gradually reduce the engine torque in order to prevent torque shocks before and after the completion of the downshifting. As a result, strictly speaking, a required torque increase is not provided immediately before the completion of the downshifting. However, according to the above-described routine, since the required torque increase is maintained until the completion of the downshifting, torque shock due to the difference between a torque level before the downshifting and that after downshifting can be reduced very effectively.

The above description has dealt with specific combinations of the two flowcharts of the specific downshift command routine, three flowcharts of the gear-shift control routine, and two flowcharts of the post-gear-shift routine, but it will be appreciated that these flowcharts can be combined in any desired way.

Furthermore, in addition to the gear-shift control and the post-gear-shift processing described above, throttle valve control in which the throttle valve opening is reduced just before the completion of downshifting to reduce the engine output and thereby to reduce the torque shock occurring upon the completion of the downshifting may be performed. In the case of a downshift to accelerate the vehicle, gear-shift control is performed by opening the throttle valve before the initiation of the downshifting and by increasing the engine output without delaying the ignition timing, while the previously described throttle valve control and ignition timing control for a downshift for vehicle deceleration are performed, if the driver has depressed the accelerator pedal to accelerate the vehicle, the ignition timing retarding may be immediately cancelled and the control may be switched to the gear-shift control for a downshift for vehicle acceleration. Conversely, while the gear-shift control for a downshift to accelerate the vehicle, if the driver has backed off the accelerator pedal to decelerate the vehicle, the control may be immediately switched to the gear-shift control for a downshift intended for deceleration.

We claim:

1. An apparatus for controlling a driving power of a vehicle having an automatic transmission and a throttle system, an opening thereof is independently controllable, comprising:

a specific downshifting command detecting means for detecting a downshifting command issued to the automatic transmission when an accelerator pedal is not depressed, a throttle valve controlling means for opening the throttle valve so that an engine power has been increased before the downshifting of the automatic transmission is actually executed when a downshifting command is detected by said specific downshifting command detecting means, and an ignition timing control means for delaying an ignition timing to compensate for the increased engine power caused by the opening of the throttle valve by said throttle valve controlling means from a point of time when the engine power is actually increased by the opening of the throttle valve by said throttle valve controlling means to a point of time just before the downshifting of the automatic transmission is actually executed and canceling the delaying of the ignition timing after the downshifting of the automatic transmission is actually executed.

2. An apparatus for controlling a driving power of a vehicle of claim 1, wherein, said throttle valve controlling means deceases the opening of the throttle valve required to decrease the engine power when a delaying amount of the ignition timing determined by said ignition timing control means exceeds a limit to cause misfire, and said ignition timing control means decrease the delaying amount of the ignition timing.

3. An apparatus for controlling a driving power of a vehicle of claim 1, wherein, said throttle valve controlling means gives a closing command to the throttle valve when an engine speed reaches a fixed engine speed determined in accordance with an estimated engine speed at the completion of the downshifting in order to return the increased engine power to the engine power at a point of time when the downshifting is detected by said specific downshifting command detecting means.

4. An apparatus for controlling a driving power of a vehicle of claim 1, wherein, said throttle valve controlling means gives opening command to the throttle valve to further open it while the automatic transmission is being shifted down.

5. A method for controlling a driving power of a vehicle having an automatic transmission and a throttle system, an opening thereof is independently controllable, comprising steps of:

a specific downshifting command detecting step for detecting a downshifting command issued to the automatic transmission when an accelerator pedal is not depressed, a throttle valve controlling step for opening the throttle valve so that an engine power has been increased before the downshifting of the automatic transmission is actually executed when a downshifting command is detected at said specific downshifting command detecting step, and an ignition timing control step for delaying an ignition timing to compensate for the increased engine power caused by the opening of the throttle valve at said throttle valve controlling step from a point of time when the engine power is actually increased by the opening of the throttle valve at said throttle valve controlling step to a point of time just before the downshifting of the automatic transmission is actually executed and canceling the delaying of the ignition timing after the downshifting of the automatic transmission is actually executed.

6. A method for controlling a driving power of a vehicle of claim 5, wherein, said throttle valve controlling step deceases the opening of the throttle valve required to decease the engine power when a delaying amount of the ignition timing determined at said ignition timing control step exceeds a limit to cause misfire, and said ignition timing control step decreases the delaying amount of the ignition timing.

7. A method for controlling a driving power of a vehicle of claim 5, wherein, said throttle valve controlling step gives closing command to the throttle valve when an engine speed reaches a fixed engine speed determined in accordance with an estimated engine speed at the completion of the downshifting in order to return the increased engine power to the engine power at a point of time when the downshifting is detected at said specific downshifting command detecting step.

8. A method for controlling a driving power of a vehicle of claim 7, wherein, said throttle valve controlling step gives opening command to the throttle valve to further open it while the automatic transmittion is being shifted down.

* * * * *